(12) United States Patent
Choi et al.

(10) Patent No.: US 9,148,502 B2
(45) Date of Patent: Sep. 29, 2015

(54) PORTABLE MULTIMEDIA PLAYBACK APPARATUS, PORTABLE MEDIA PLAYBACK SYSTEM, AND METHOD FOR CONTROLLING OPERATIONS THEREOF

(75) Inventors: Kyungdong Choi, Seoul (KR); Seongwon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 774 days.

(21) Appl. No.: 12/945,746

(22) Filed: Nov. 12, 2010

(65) Prior Publication Data
US 2011/0269506 A1 Nov. 3, 2011

(30) Foreign Application Priority Data
Apr. 29, 2010 (KR) .................. 10-2010-0039993

(51) Int. Cl.
*H04M 1/00* (2006.01)
*H04M 1/725* (2006.01)

(52) U.S. Cl.
CPC .................................. *H04M 1/7253* (2013.01)

(58) Field of Classification Search
USPC ........................................................ 455/566
See application file for complete search history.

(56) References Cited

U.S. PATENT DOCUMENTS

| | | | |
|---|---|---|---|
| 2006/0112339 A1 | 5/2006 | Struthers et al. | |
| 2006/0258289 A1* | 11/2006 | Dua ............................. | 455/41.3 |
| 2007/0243907 A1* | 10/2007 | Jin et al. ......................... | 455/566 |
| 2008/0198141 A1* | 8/2008 | Lee et al. ....................... | 345/173 |
| 2009/0098888 A1* | 4/2009 | Yoon ........................... | 455/456.2 |
| 2009/0186604 A1* | 7/2009 | Ruy et al. ..................... | 455/414.3 |
| 2009/0251557 A1* | 10/2009 | Kim et al. .................... | 348/222.1 |
| 2010/0162182 A1* | 6/2010 | Oh et al. ........................ | 715/863 |
| 2011/0019556 A1* | 1/2011 | Hsin et al. ...................... | 370/252 |

FOREIGN PATENT DOCUMENTS

| | | |
|---|---|---|
| KR | 10-2008-0065878 A | 7/2008 |
| KR | 10-2009-0094941 A | 9/2009 |
| KR | 10-2010-0024206 A | 3/2010 |
| WO | 2004/075169 A2 | 9/2004 |

\* cited by examiner

*Primary Examiner* — Ajibola Akinyemi
(74) *Attorney, Agent, or Firm* — Birch, Stewart, Kolasch & Birch, LLP

(57) ABSTRACT

A portable multimedia playback apparatus, a portable multimedia playback system, and a method for controlling operations thereof are disclosed. The method for controlling an operation of the portable multimedia playback apparatus having a display unit for displaying an image corresponding to a played-back multimedia content and a controller for outputting a display signal to the display unit to display the image corresponding to the played-back multimedia content on the display unit, includes receiving a signal from a mobile terminal capable of executing a phone application, determining status information about the mobile terminal from information included in the received signal, and outputting a display signal from the controller to the display unit such that an image corresponding to the determined status information is displayed on the display unit.

19 Claims, 14 Drawing Sheets

PORTABLE MULTIMEDIA PLAYBACK APPARATUS, PORTABLE MEDIA PLAYBACK SYSTEM, AND METHOD FOR CONTROLLING OPERATIONS THEREOF

CROSS-REFERENCE TO RELATED APPLICATIONS

This application claims the benefit of Korean Application No. 10-2010-0039993, filed on Apr. 29, 2010, the disclosure of which is incorporated herein by reference in its entirety.

BACKGROUND OF THE INVENTION

1. Field of the Invention

The present disclosure relates to a portable multimedia playback apparatus (PMPA), a portable multimedia playback system, and a method for controlling operations thereof, and more particularly, to a PMPA for enabling a user to identify the status of a mobile terminal and being capable of controlling a phone application, a portable multimedia playback system, and a method for controlling operations thereof.

2. Description of Related Art

A portable multimedia player (PMP) is a portable electronic device capable of playing back a variety of multimedia contents. The multimedia contents may include audio contents, video contents, text contents, or composite contents being a combination of two or more of the audio contents, video contents, and text contents. More specifically, the multimedia contents may be movies, music, books, and the like.

One form of a PMP is a portable multimedia playback apparatus (PMPA), which may be connected, either wirelessly or wiredly, to an external electronic device that provides contents and plays back contents received from the external electronic device. In addition, the PMPA may store the received contents. However, existing PMPAs provide little information, if any about the status of the external electronic device while being connected to the external electronic device.

BRIEF SUMMARY OF THE INVENTION

Therefore, the present disclosure at least the problem identified with the related art, and it is an object of the present disclosure to provide a PMPA for displaying information about the status of an external electronic device that can be connected to the PMPA, either wirelessly or wiredly, so that a user can identify the status of the external electronic device during viewing contents played back in the PMPA, a portable multimedia playback system including a PMPA, and methods for controlling operations thereof.

It is another object of the present disclosure to provide a PMPA for displaying information about the status of a mobile terminal capable of executing a phone application, a portable multimedia playback system including the PMPA, and method for controlling operations thereof.

In accordance with an aspect of the present disclosure, the above and other objects can be accomplished by the provision of a PMPA including a display unit configured to display multimedia content, a controller configured to output a signal to the display unit to display an image related to the multimedia content, and a wireless communication module configured to wirelessly transmit and receive signals to and from a mobile terminal capable of executing a phone application. The controller is configured to determine status information about the mobile terminal from information included in a signal received through the wireless communication module and output a display signal to the display unit to display an image corresponding to the determined status information about the mobile terminal.

In accordance with a further aspect of the present disclosure, there is provided a method for controlling an operation of a PMPA including a display unit configured to display multimedia content and a controller configured to output a signal to the display unit to display an image related to the multimedia content. The method includes receiving a signal from a mobile terminal capable of executing a phone application, determining status information about the mobile terminal from information included in the received signal, and outputting a display signal from the controller to the display unit to display an image corresponding to the determined status information about the mobile terminal.

In accordance with another aspect of the present disclosure, there is provided a portable multimedia playback system having a mobile terminal configured to execute a phone application and a PMPA. The PMPA includes a display unit configured to display multimedia content, a controller configured to output a signal to the display unit to display an image related to the multimedia content, and a wireless communication module configured to wirelessly transmit and receive signals to and from the mobile terminal. The controller is configured to determine status information about the mobile terminal from information included in a signal received through the wireless communication module and output a display signal to the display unit to display an image corresponding to the determined status information about the mobile terminal.

In accordance with a further aspect of the present disclosure, there is provided a method for controlling an operation of a portable multimedia playback system having PMPA and a mobile terminal capable of executing a phone application, the PMPA including a display unit configured to display multimedia content and a controller configured to output a signal to the display unit to display an image related to the multimedia content. The method includes transmitting a signal including status information about the mobile terminal to the PMPA by the mobile terminal, receiving the signal from the mobile terminal by the PMPA, determining the status information about the mobile terminal from the received signal by the PMPA, and outputting a display signal to the display unit of the PMPA by the controller of the PMPA such that an image corresponding to the determined status information is displayed on the display unit of the PMPA.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

The present invention will hereinafter be described in detail with reference to the accompanying drawings in which exemplary embodiments of the invention are shown. Further, the term 'mobile terminal' as used herein may indicate a mobile phone, a smart phone, a laptop computer, a digital broadcast receiver, a personal digital assistant (PDA), a portable multimedia player (PMP), a navigation device and the like. In this disclosure, the terms 'module' and 'unit' can be used interchangeably.

Figure 1:
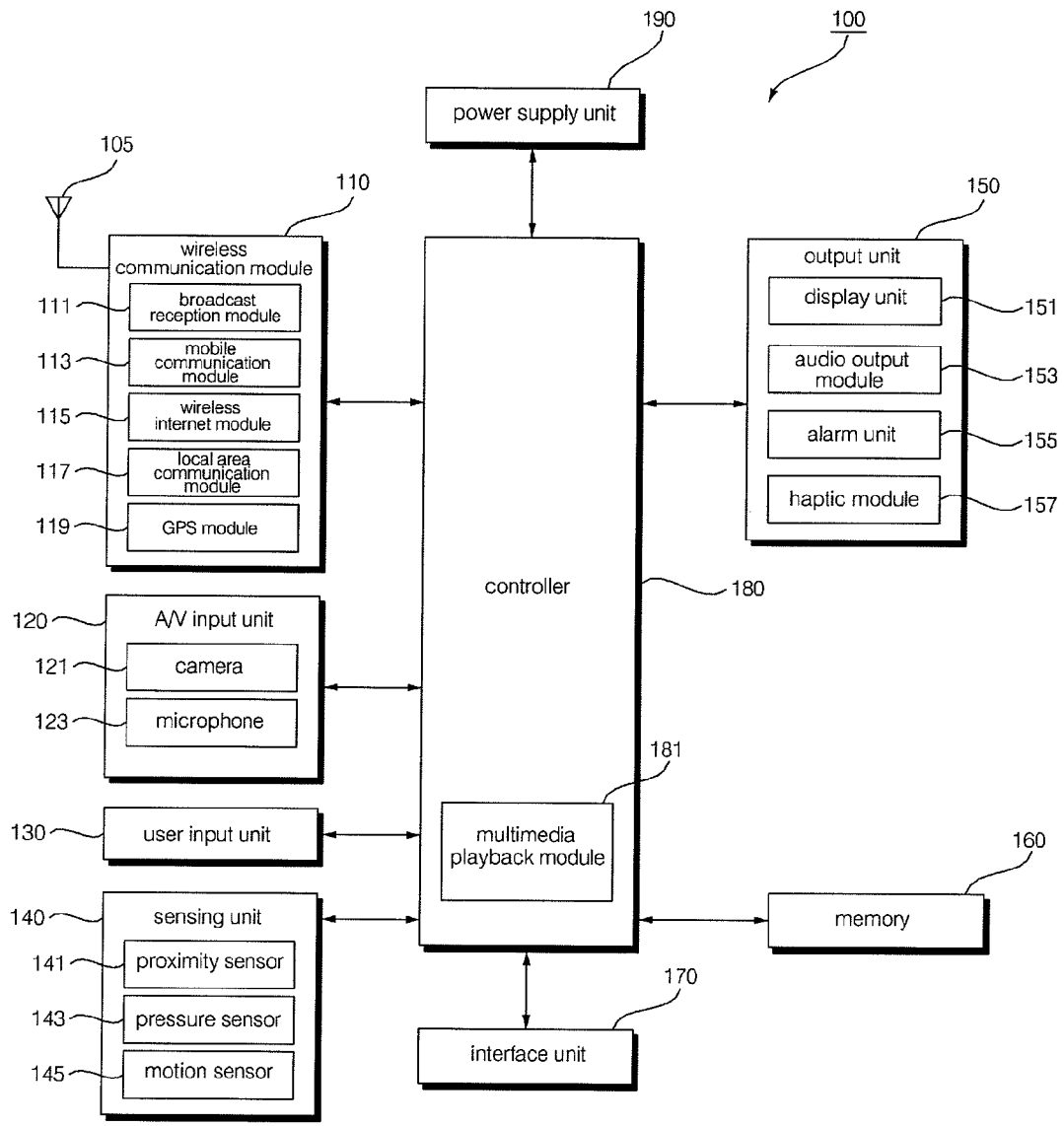
FIG. 1 is a block diagram of a mobile terminal for use in a portable multimedia playback system according to an exemplary embodiment of the present disclosure.

First, FIG. 1 is a block diagram illustrating a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. In addition, two or more of the elements may be combined into one element, or one element may be divided into two or more elements, if appropriate.

Further, in the embodiment in FIG. 1, the wireless communication unit 110 includes a broadcast reception module 111, a mobile communication module 113, a wireless Internet module 115, a short-range communication module 117, and a global positioning system (GPS) module 119. The broadcast reception module 111 receives broadcast signals and/or broadcast-related information from an external broadcast management server through a broadcast channel. Further, the broadcast channel may be a satellite channel or a terrestrial channel. Also, the broadcast management server may be a server which generates broadcast signals and/or broadcast-related information and transmits the generated broadcast signals and/or the generated broadcast-related information, or may be a server which receives and then transmits previously-generated broadcast signals and/or previously-generated broadcast-related information.

In addition, the broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. Further, the broadcast-related information may be provided to the mobile terminal 100 through a mobile communication network. In this instance, the broadcast-related information may be received by the mobile communication module 113, rather than by the broadcast reception module 111. The broadcast-related information may also come in various forms.

In addition, the broadcast reception module 111 can receive broadcast signals using various broadcasting systems such as the digital multimedia broadcasting-terrestrial (DMB-T) system, the digital multimedia broadcasting-satellite (DMB-S) system, the media forward link only (Media-FLO) system, the DVB-H system, and the integrated services digital broadcast-terrestrial (ISDB-T) system. In addition, the broadcast reception module 111 may be suitable not only for the above-mentioned digital broadcasting systems but also for nearly all types of broadcasting systems other than those set forth herein. The broadcast signal and/or the broadcast-related information received by the broadcast reception module 111 can also be stored in the memory 160.

In addition, the mobile communication module 113 can transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages. Further, the wireless Internet module 115 corresponds to a module for wirelessly accessing the Internet. The wireless Internet module 115 may also be embedded in the mobile terminal 100 or may be installed in an external device. The wireless Internet module 115 may also use various wireless Internet technologies such as the wireless local area network (WLAN), Wireless Broadband (WiBro), World Interoperability for Microwave Access (Wimax), and High Speed Downlink Packet Access (HSDPA).

In addition, the short-range communication module 117 corresponds to a module for short-range communication and may use various short-range communication techniques such as Bluetooth, radio frequency identification (RFID), infrared data association (IrDA), ultra wideband (UWB), and ZigBee. Further, the GPS module 119 can receive position information from a plurality of GPS satellites. Also, the A/V input unit 120 can be used to receive audio signals or video signals, and in FIG. 1 includes a camera 121 and a microphone 123.

In more detail, the camera 121 processes various image frames such as still images or moving images captured by an image sensor during a video call mode or an image capturing mode. The image frames processed by the camera 121 can also be displayed by a display module 151 included in the output unit 150. Further, the image frames processed by the camera 121 may be stored in the memory 160 or may be transmitted to an external device through the wireless communication unit 110. The mobile terminal 100 may also include two or more cameras 121.

In addition, the microphone 123 can receive external (e.g., voice) sound signals during a call mode, a recording mode, or a voice recognition mode with the use of a microphone and can convert the sound signals into electrical sound data. In the call mode, the mobile communication module 113 converts the electrical sound data into data that can be readily transmitted to a mobile communication base station and then outputs the data obtained by the conversion. The microphone 123 may also use various noise removal algorithms to remove noise that may be generated during the reception of external sound signals.

In addition, the user input unit 130 can generate key input data based on user input for controlling the operation of the mobile terminal 100. The user input unit 130 may be implemented as a keypad, a dome switch, a touch pad (static pressure/static voltage), a jog wheel, a jog switch, and the like. In particular, if the user input unit 130 is implemented as a touch pad and forms a mutual layer structure with the display module 151, the user input unit 130 and the display module 151 may be collectively referred to as a touch screen.

Further, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 can determine whether the mobile terminal 100 is opened or closed. In addition, the sensing unit 140 can determine whether the mobile terminal 100 is powered by the power supply unit 190 and whether the interface unit 170 is connected to an external device.

Further, in the embodiment in FIG. 1, the sensing unit 140 includes a proximity sensor 141, a pressure sensor 143 and a motion sensor 145. The proximity sensor 141 can detect an approaching object or whether there is an object nearby the mobile terminal 100 without mechanical contact. More specifically, the proximity sensor 141 can detect an approaching object based on a change in an alternating current (AC) magnetic field or a static magnetic field, or the rate of change of capacitance. The sensing unit 140 may also include two or more proximity sensors 141.

In addition, the pressure sensor 143 can determine whether pressure is being applied to the mobile terminal 100 and/or measure the level of pressure, if any, applied to the mobile terminal 100. The pressure sensor 143 may also be installed in a certain part of the mobile terminal 100 where the detection of pressure is needed. For example, the pressure sensor 143 may be installed in the display module 151. In this instance, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

Further, the motion sensor 145 can determine the location and motion of the mobile terminal 100 using an acceleration sensor or a gyro sensor. In more detail, acceleration sensors are a type of device for converting a vibration in acceleration into an electric signal. With recent developments in microelectromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some instances when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate. Further, gyro sensors are sensors for measuring angular velocity, and can determine the relative direction of the rotation of the mobile terminal 100 to a reference direction.

In addition, the output unit 150 can output audio signals, video signals and alarm signals. In the embodiment in FIG. 1, the output unit 150 includes the display module 151, an audio output module 153, an alarm module 155 and a haptic module 157. The display module 151 can display various information processed by the mobile terminal 100. For example, if the mobile terminal 100 is in a call mode, the display module 151 can display a user interface (UI) or a graphic user interface (GUI) for making or receiving a call. If the mobile terminal 100 is in a video call mode or an image capturing mode, the display module 151 can display a UI or a GUI for capturing or receiving images.

Further, if the display module 151 and the user input unit 130 form a mutual layer structure and are thus implemented as a touch screen, the display module 151 can be used as both an output device and an input device. If the display module 151 is implemented as a touch screen, the display module 151 can also include a touch screen panel and a touch screen panel controller. In more detail, the touch screen panel is a transparent panel attached onto the exterior of the mobile terminal 100 and may be connected to an internal bus of the mobile terminal 100.

The touch screen panel keeps monitoring whether the touch screen panel is being touched by the user, and once a touch input to the touch screen panel is received, the touch screen panel transmits a number of signals corresponding to the touch input to the touch screen panel controller. The touch screen panel controller then processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

Further, the display module 151 may include electronic paper (e-paper), which is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules, for example.

In addition, the display module 151 may include at least one of a liquid crystal display (LCD), a thin film transistor (TFT)-LCD, an organic light-emitting diode (OLED), a flexible display, and a three-dimensional (3D) display. The mobile terminal 100 may also include two or more display modules 151. For example, the mobile terminal 100 may include an external display module and an internal display module.

Further, the audio output module 153 can output audio data received by the wireless communication unit 110 during a call reception mode, a call mode, a recording mode, a voice recognition mode, or a broadcast reception mode and/or output audio data present in the memory 160. In addition, the audio output module 153 can output various sound signals associated with the functions of the mobile terminal 100 such as receiving a call or a message. The audio output module 153 may also include a speaker and a buzzer.

Also, the alarm module 155 can output an alarm signal indicating the occurrence of an event in the mobile terminal 100. Examples of the event include receiving a call signal, receiving a message, and receiving a key signal. Examples of the alarm signal output by the alarm module 155 also include an audio signal, a video signal and a vibration signal. More specifically, the alarm module 155 can output an alarm signal upon receiving a call signal or a message. In addition, the alarm module 155 can receive a key signal and output an alarm signal as feedback to the key signal. Therefore, the user can easily recognize the occurrence of an event based on an alarm signal output by the alarm module 155. Further, an alarm signal for notifying the user of the occurrence of an event may be output not only by the alarm module 155, but also by the display module 151 or the audio output module 153.

In addition, the haptic module 157 can provide various haptic effects (such as vibration) that can be perceived by the user. If the haptic module 157 generates vibration as a haptic effect, the intensity and the pattern of vibration generated by the haptic module 157 may be altered in various manners. The haptic module 157 can also synthesize different vibration effects and output the result of the synthesization. Alternatively, the haptic module 157 can sequentially output different vibration effects. Further, the haptic module 157 may provide various haptic effects other than vibration such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may also be configured to enable the user to recognize a haptic effect using the kinesthetic sense of the fingers or the arms. Also, the mobile terminal 100 may include two or more haptic modules 157.

In addition, the memory 160 can store various programs used for the operation of the controller 180, and temporarily store various data such as a list of contacts, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 can also operate a web storage on the Internet, which performs the functions of the memory 160.

Further, the interface unit 170 interfaces with an external device that can be connected to the mobile terminal 100. In more detail, the interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 can also receive data from an external device or be powered by an external device, and transmit data provided by an external device to other components in the mobile terminal 100 or transmit data provided by other components in the mobile terminal 100 to an external device. In addition, when the mobile terminal 100 is connected to an external cradle, the interface unit 170 provides a path for supplying power from the external cradle to the mobile terminal 100 or for transmitting various signals from the external cradle to the mobile terminal 100.

Further, the controller 180 controls the general operations of the mobile terminal 100. For example, the controller 180 can perform various control operations regarding making/receiving a voice call, transmitting/receiving data, or making/receiving a video call. In FIG. 1, the controller 180 also includes a multimedia player module 181, which plays multimedia data. The multimedia player module 181 may be implemented as a hardware device and may be installed in the controller 180. Alternatively, the multimedia player module 181 may be implemented as a software program.

In addition, the power supply unit 190 may be supplied with power by an external power source or an internal power source and supply power to the other components in the mobile terminal 100. The mobile terminal 100 may include a wired/wireless communication system or a satellite communication system and thus can operate in a communication system capable of transmitting data in units of frames or packets.

Figure 2:
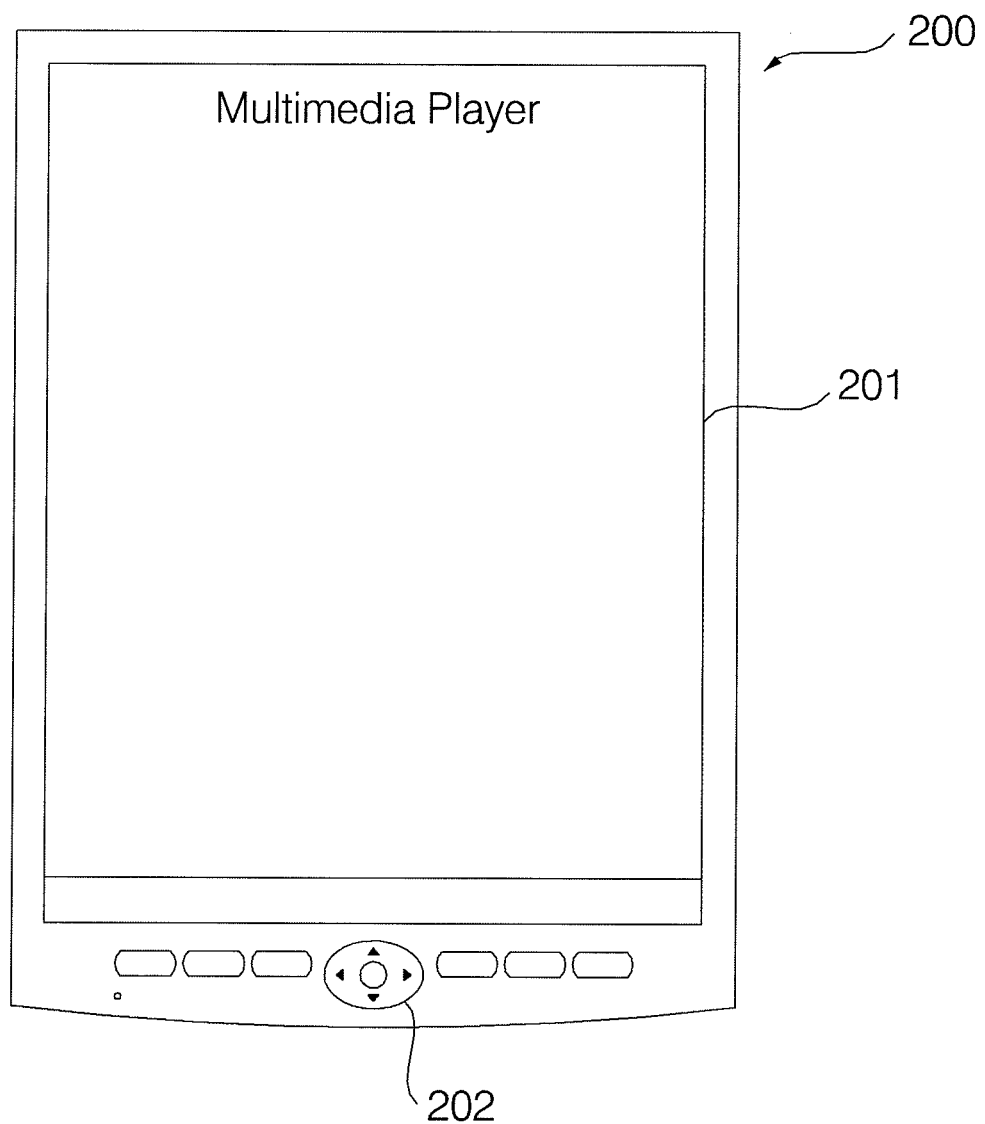
FIG. 2 illustrates the exterior of a PMPA according to an exemplary embodiment of the present disclosure.

Next, the exterior of a PMPA and components thereof according to an exemplary embodiment of the present disclosure will be described with reference to FIGS. 2 and 3. Specifically, FIG. 2 illustrates the exterior of a PMPA 200 according to an exemplary embodiment of the present disclosure, and FIG. 3 is a block diagram of the PMPA 200 communicating with a mobile terminal 100, e.g., a portable multimedia playback system, according to an exemplary embodiment of the present disclosure.

The PMPA 200 is a device that plays back multimedia contents. As stated before, the multimedia contents may include movies, music, books and the like. In one particular application, the PMPA 200 may be configured as an e-book reader such that a user may read digital book contents on the PMPA 200. In other application, the PMPA 200 may be an IPAD.

Further, the PMPA 200 displays a content-related image that is being played back on a screen 201. The user may enter a command to the PMPA 200 by using an input device 202 such as a button, a key, or the like. The PMPA 200 may play back multimedia contents or discontinue playing back multimedia contents in response to the received command. The PMPA 200 may also change the display status of the contents displayed on the screen 201 in accordance with a command received through the user input device 202.

Figure 3:
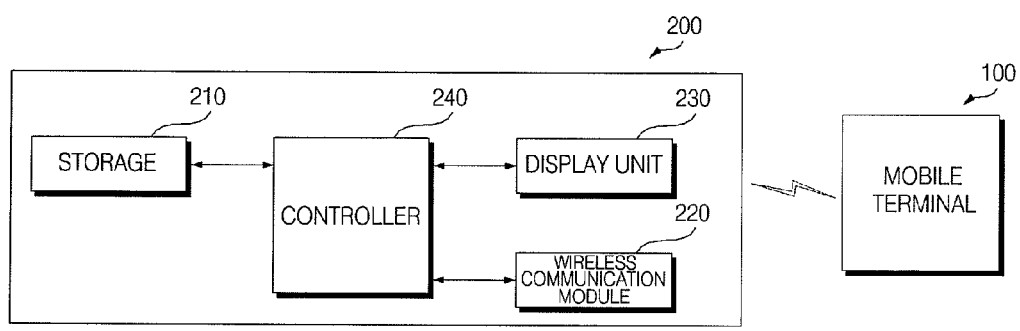
FIG. 3 is a block diagram of the PMPA according to an exemplary embodiment of the present disclosure.

Referring to FIG. 3, the PMPA 200 may be configured to wirelessly transmit and receive signals to and from a mobile terminal 100. For example, if the PMPA 200 is an IPAD, the mobile terminal may be an IPHONE. The PMPA 200 includes a wireless communication module 220 for wirelessly transmitting and receiving signals to and from the mobile terminal 100, a display unit 230 for displaying the screen 201, a storage 210 for storing contents that can be played back in the PMPA 200, and a controller 240 for outputting a display signal to the display unit 230 so as to display an image corresponding to status information about the mobile terminal 100. The status information about the mobile terminal 100 is determined based on a signal received through the wireless communication module 220. In particular, the PMPA 200 may display an image corresponding to status information about the mobile terminal 100 on the screen 201. Specifically, the controller 240 of the PMPA 200 determines the status information about the mobile terminal 100 based on a signal received from the mobile terminal 100 through the wireless communication module 220 and displays an image corresponding to the status information about the mobile terminal 100 on the screen 201.

Further, the mobile terminal 100, which communicates with the PMPA 200, is capable of executing a phone application based on commands received from the PMPA 200. Also, the mobile terminal 100 is capable of executing a message transmission/reception application based on commands received from the PMPA 200.

As noted above, the PMPA 200 may determine status information about the mobile terminal 100 based on a signal received from the mobile terminal 100. For example, the PMPA 200 can identify at least the following statuses of the mobile terminal 100. The PMPA 200 may identify a current mode of the mobile terminal 100 such as, for example, a an incoming call mode in which the mobile terminal 100 receives an incoming call, an incoming message mode in which the mobile terminal 100 receives a message, and an idle mode. When the current mode of the mobile terminal 100 changes, the mobile terminal 100 transmits a signal carrying changed status information to the PMPA 200. The PMPA 200 may then display information about the change in the current mode of the mobile terminal 100 on the screen 201 according to the status information received from the mobile terminal 100.

In addition, the PMPA 200 may identify whether a user of the mobile terminal 100 has read a received message or has answered an incoming call. The PMPA 200 may also identify an alarm status and/or scheduled status of the mobile terminal 100. More specifically, the mobile terminal 100 transmits a signal carrying information about its message reception status, incoming call reception status, alarm status, and/or scheduled status to the PMPA 200. Thus the PMPA 200 can identify, based on the information included in the received signal, whether the mobile terminal 100 has received a message, whether there are any missed incoming calls for the user of the mobile terminal 100, and/or whether it is a scheduled time for which the user of the mobile terminal 100 has set as an alarm. The PMPA 200 may display a status bar with icons representing the status information about the mobile terminal 100 on the screen 201.

The user of the PMPA 200 may choose which status information about the mobile terminal 100 to be displayed, which can be viewed through the PMPA 200. For example, the user of the PMPA 200 may choose an icon to be included in the status bar. Specifically, the user of the PMPA 200 may enter a command for selecting an icon representing a message reception status for inclusion in the status bar to the PMPA 200. In addition, the user of the PMPA 200 may enter a command for selecting an icon representing an incoming call reception status for inclusion in the status bar to the PMPA 200.

Thus, the PMPA 200 displays images corresponding to the user-desired status information related to the mobile terminal 100 on the screen 201. More specifically, the PMPA 200 displays a status bar including icons selected according to user-input selection commands. The PMPA 200 changes the display statuses of icons included in the status bar in correspondence with the status information about the mobile terminal 100.

In addition to selecting which status information to include, the area in which the images corresponding to the status information about the mobile terminal 100 are displayed may be changed. Specifically, the user may enter a command to change the display area of the images representing the status information about the portable terminal 100 to the PMPA 200. For instance, the user may enter a command to zoom in the display area of the images corresponding to the status information about the mobile terminal 100 to the PMPA 200. If the display unit 230 of the PMPA 200 is implemented into a touch screen, the user may enter the display area zoom-in command to the PMPA 200 by touching and then dragging the images corresponding to the status information about the mobile terminal 100. In another example, the PMPA 200 may determine that the display area zoom-in command has been received when the user has touched the images corresponding to the status information for a predetermined time or longer. Once a zoom-in command is determined, the PMPA 200 may enlarge the display area of the images corresponding to the status information.

In addition to enlarging the display area of the images corresponding to the status information, the PMPA 200 may enlarge the images corresponding to the status information at a zoom-in ratio and/or may add an image corresponding to another piece of status information about the mobile terminal 100.

Further, the PMPA 200 may be configured to identify the location of the mobile terminal 100 based on a signal received from the mobile terminal 100. Then the PMPA 200 may display the images corresponding to status information about the mobile terminal 100 in a display area corresponding to the location of the mobile terminal 100 on the screen 201. For example, when the PMPA 200 determines that the mobile terminal 100 is positioned to the right of the PMPA 200, the PMPA 200 displays the images corresponding to the status information about the mobile terminal 100 on a right side of the screen 201.

While the exemplary embodiment has been described as a single PMPA 200 and a single mobile terminal 100, the PMPA 200 may be connected to at least two mobile terminals. As described above, one or all of these mobile terminals may be capable of executing a phone application. Also, the mobile terminals may include a portable electronic device such as a laptop computer, an MP3 player, and the like. The PMPA 200 may determine status information about each connected mobile terminal based on a signal received from the corresponding mobile terminal. The PMPA 200 may display images corresponding to the status information about the mobile terminals on the screen 201.

Further, the PMPA 200 may display the images corresponding to the status information about each portable terminal in an area corresponding to the location of the mobile terminal. For example, when first and second portable terminals are located to the right and left sides of the PMPA 200, respectively, the PMPA 200 displays images corresponding to status information about the first mobile terminal on a right sight of the screen 201 and displays images corresponding to status information about the second mobile terminal on a left side of the screen 201.

The PMPA 200 may display a keyboard object on the screen 201 through which text to be transmitted to the mobile terminal 100 can be entered. Specifically, the PMPA 200 may display the keyboard object on the screen 201 in accordance with a user-input keyboard object display command. For example, the user may enter the keyboard object display command to the PMPA 200 after reading text received at the mobile terminal 100 through the PMPA 200. Then the PMPA 200 may transmit a signal carrying text that the user has entered on the keyboard object to the mobile terminal 100. When transmitting the signal carrying the text to the mobile terminal 100, the PMPA 200 may use a short-range communication standard such as Bluetooth, wireless Internet, and the like. The mobile terminal 100 may output a message based on the text received from the PMPA 200 to another mobile terminal or a base station.

Next, various methods for controlling the PMPA 200 will be described with respect to FIGS. 4 to 6.

Figure 4:
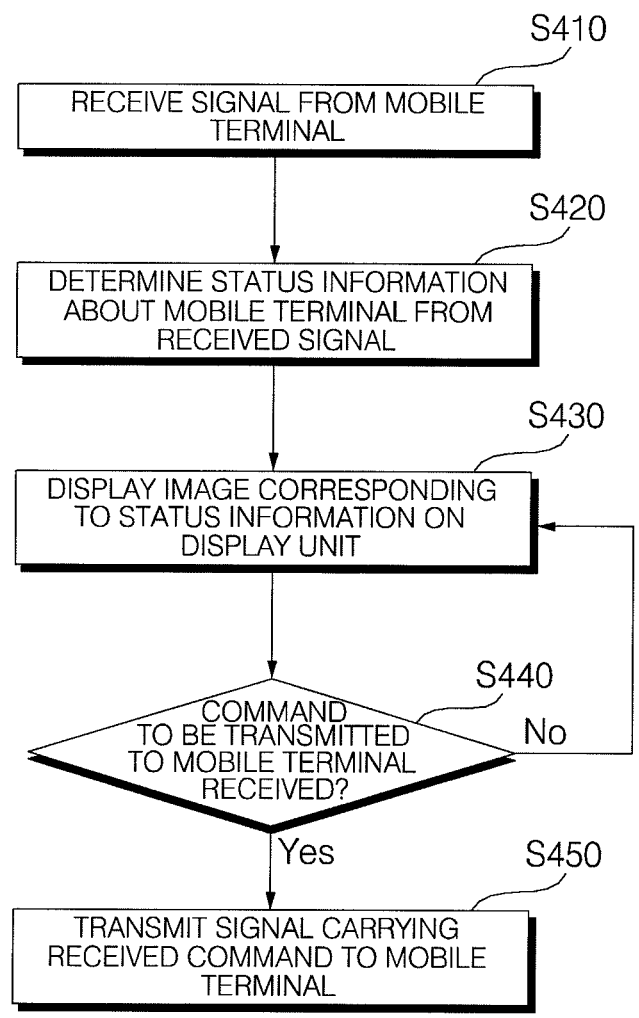
FIGS. 4, 5, and 6 are flowcharts illustrating methods for controlling an operation of the PMPA according to exemplary embodiments of the present disclosure.

Referring to FIG. 4, the PMPA 200 receives a signal from the mobile terminal 100 in step S410. The PMPA 200 may transmit and receive signals to and from the mobile terminal 100 in compliance with a wireless communication standard in this exemplary embodiment. Accordingly, the PMPA 200 may receive a signal from the mobile terminal 100 according to the wireless communication standard. For example, the PMPA 200 may receive a signal from the mobile terminal 100 according to a Bluetooth communication standard. In another example, the PMPA 200 may transmit and receive Radio Frequency (RF) signals to and from the mobile terminal 100 according to an RF communication standard. In a further example, the PMPA 200 may transmit and receive radio signals to and from the mobile terminal 100 according to a wireless Internet communication standard such as WiFi. It is understood that before wireless signal transmission and reception occurs, the PMPA 200 may be paired with the mobile terminal 100. The pairing is the process of identifying the other electronic device and registering it as the other party for wireless communication.

Next, the PMPA 200 determines status information about the mobile terminal 100 from the received signal in step S420. The status information about the mobile terminal 100 may include information about the current mode of the mobile terminal 100, information about message reception status, incoming call reception status, alarm status, and/or scheduled status of the mobile terminal 100.

The PMPA 200 then displays images corresponding to the status information about the mobile terminal 100 on the display unit in step S430. More specifically, the PMPA 200 may display a status bar with icons representing the status information about the mobile terminal 100 on the screen 201 so that the user may identify the status of the mobile terminal 100 from the icons.

After identifying the status of the mobile terminal 100, the user may enter a mobile terminal control command to the PMPA 200. In step S440, the PMPA 200 determines whether a command to be transmitted to the mobile terminal 100 has been received. For example, after reading a first message received at the mobile terminal 100 through the PMPA 200, the user may write a second message as a reply to the first message in the PMPA 200. Then the user may enter a reply send command to the PMPA 200. Then the PMPA 200 transmits a signal corresponding to the received reply send command to the mobile terminal 100 in step S450. For example, the PMPA 200 may transmit a signal carrying the second message to the mobile terminal 100. Upon receipt of the second message, the mobile terminal 100 may output the second message to another mobile terminal 100 from which it has received the first message.

Figure 5:
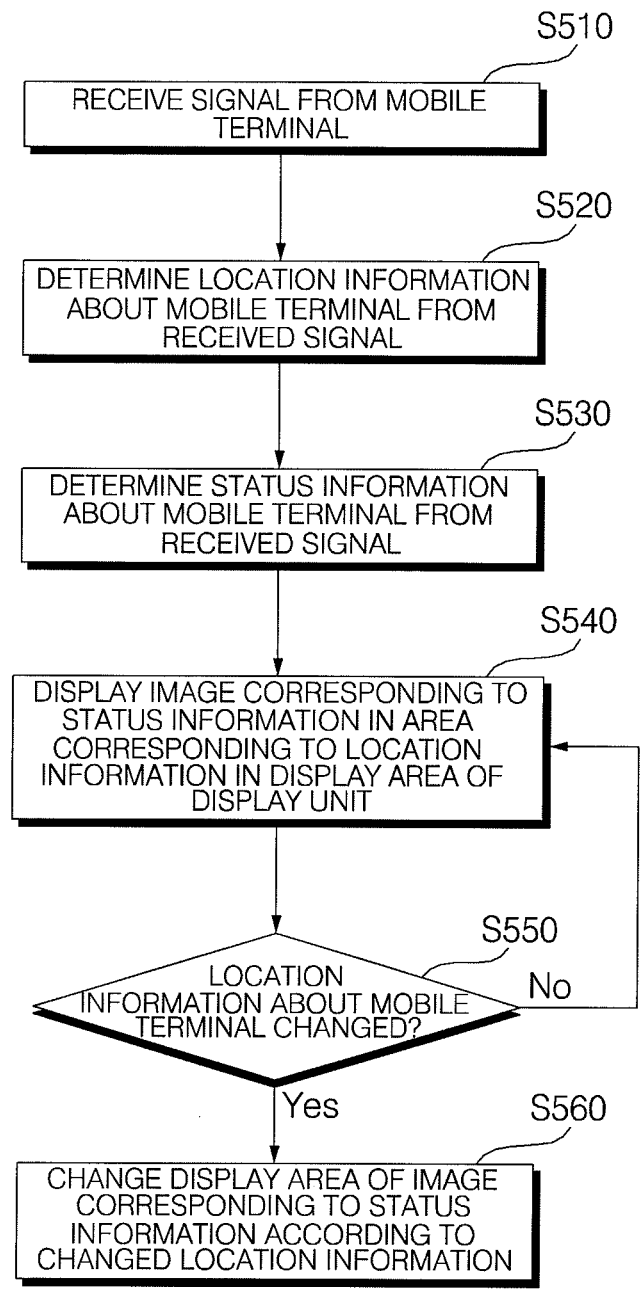

Referring to FIG. 5, the PMPA 200 receives a signal from the mobile terminal 100 in step S510. In this exemplary embodiment, the PMPA 200 may transmit and receive signals to and from the mobile terminal 100 in accordance with a Bluetooth or wireless Internet communication standard as noted above. The PMPA 200 also determines location information about the mobile terminal 100 from the received signal in step S520. The location information about the mobile terminal 100 may include information about a street or place in which the mobile terminal 100 is located with respect to the PMPA 200.

In step S530, the PMPA 200 determines status information from the received signal. The status information about the mobile terminal 100 may indicate the current mode, message reception status, incoming call reception status, alarm status, and/or scheduled status of the mobile terminal 100. The PMPA 200 displays images corresponding to the status information about the mobile terminal 100 in an area corresponding to the location information in a display area of the display unit in step S540. In this exemplary embodiment, the images corresponding to the status information may include icons that vary in color, size, and shape according to the status information. Also, the images corresponding to the status information may include a pop-up window for displaying the status information in text form or the like. When determining that the mobile terminal 100 is located to the right side of the PMPA 200, the PMPA 200 may display the images corresponding to the status information on the right side of the screen 201.

In step S550, the PMPA 200 determines whether the location information about the mobile terminal 100 has changed. For instance, the mobile terminal 100 may have moved from the right side to the left side of the PMPA 200. If the location information about the mobile terminal 100 has changed, the PMPA 200 changes the display area of the images representing the status information in correspondence with the changed location information about the mobile terminal 100 in step S560. That is, if the PMPA 200 determines that the mobile terminal 100 has moved to the left side of the PMPA 200, the PMPA 200 may move the display area of the images corresponding to the status information from the right side to the left side of the screen 201.

Figure 6:
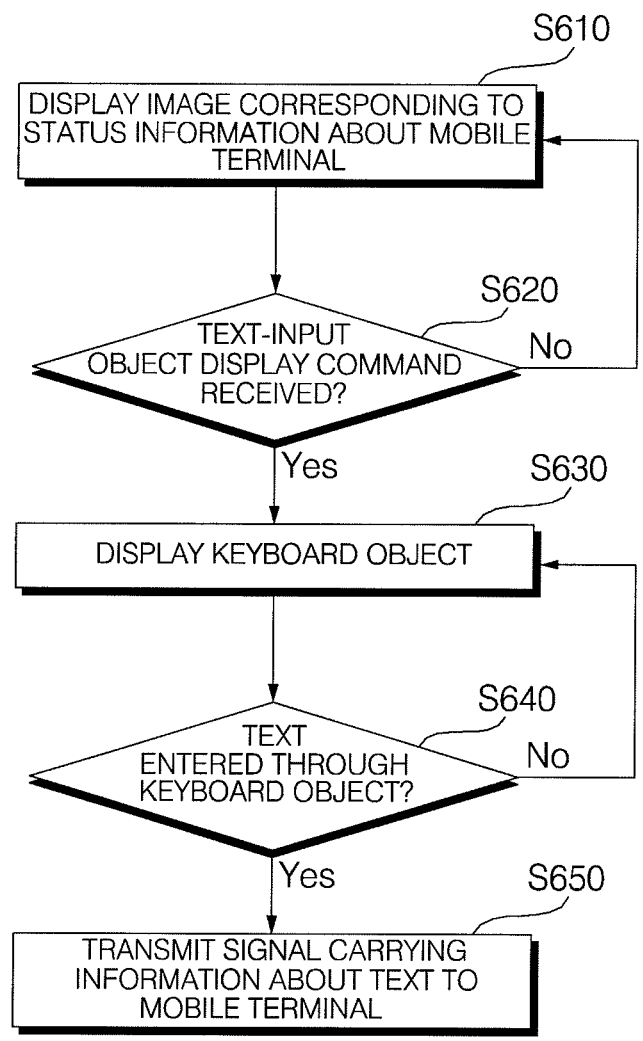

Referring to FIG. 6, the PMPA 200 displays images corresponding to status information about the mobile terminal 100 included in a received signal in step S610. The user may identify the status of the mobile terminal 100 from the displayed images. For example, the user may read a message received at the mobile terminal 100 through the PMPA 200.

After the user reads a message received at the mobile terminal 100 through the PMPA 200, the user may enter a text-input object display command to the PMPA 200 in step S620. The text-input object includes a keyboard or a keypad that can be displayed on the display unit of the PMPA 200. If the display unit is implemented into a touch screen, the PMPA 200 may display a keyboard object on the touch screen in step S630. The PMPA 200 monitors receipt of text through the keyboard object in step S640. For example, when the keyboard object is displayed on the touch screen, the PMPA 200 determines whether the keyboard object has been touched. Upon detection of a touch on the keyboard object, the PMPA 200 may identify text that the user has input to the PMPA 200, based on the touched area of the touch screen. The PMPA 200 then transmits a signal carrying the user-input text to the mobile terminal 100 in step S650. The mobile terminal 100 may output a reply message for the received message based on the text included in the received signal.

Having described various methods for controlling the operation of the PMPA 200 above, implementation of the various methods will be described with reference to various embodiments of portable multimedia playback systems shown in FIGS. 7 to 12.

Figure 7:
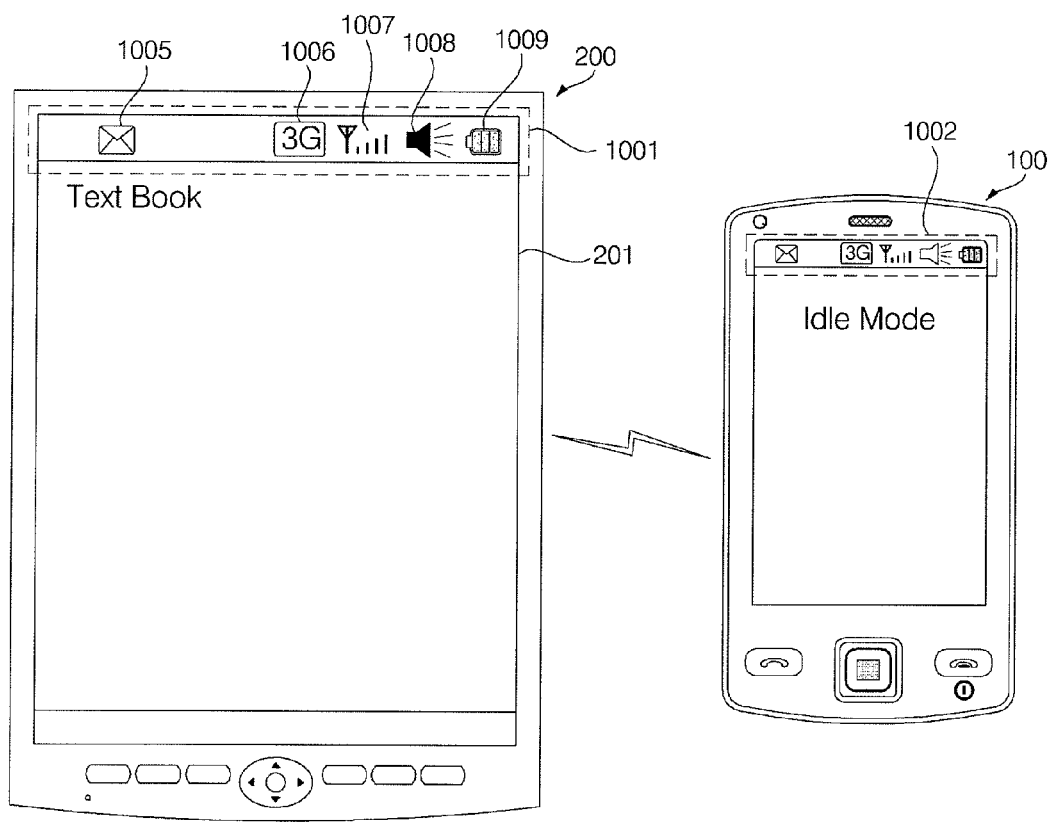
FIGS. 7 to 12 are views referred to for describing methods for controlling an operation of the portable multimedia playback system according to exemplary embodiments of the present disclosure.

Referring to FIG. 7, the PMPA 200 according to an exemplary embodiment may wirelessly transmit and receive signals to and from the mobile terminal 100. The PMPA 200 may determine status information about the mobile terminal 100 from a signal received from the mobile terminal 100 and display images corresponding to the status information about the mobile terminal 100 on the screen 201. In this exemplary embodiment of the present disclosure, the PMPA 200 displays a status bar 1001 with icons representing the status information in an upper part of the screen 201. In the status bar 1001, the icons relate to the same status information as represented by icons included in a status bar 1002 displayed on the mobile terminal 100. More specifically, the status bar 1001 displayed in the PMPA 200 includes a first icon 1005 representing the message reception status of the mobile terminal 100, a second icon 1006 representing a communication standard used for the mobile terminal 100, a third icon 1007 representing the reception sensitivity of the mobile terminal 100, a fourth icon 1008 representing the sound volume of the mobile terminal 100, and a fifth icon 1009 representing the residual battery power of the mobile phone 100. The remaining portion of the screen 201 continues to display information related to the contents being played by the PMPA 200, which in this embodiment is textual information regarding a book.

The user may enter an icon add command to the PMPA 200 in order to add an icon to the status bar 1001. Also, the user may enter an icon delete command to the PMPA 200 in order to delete an icon from the status bar 1001. Accordingly, the PMPA 200 may add or delete an icon to or from the status bar 1001 in response to the icon add or delete command received from the user.

Figure 8:
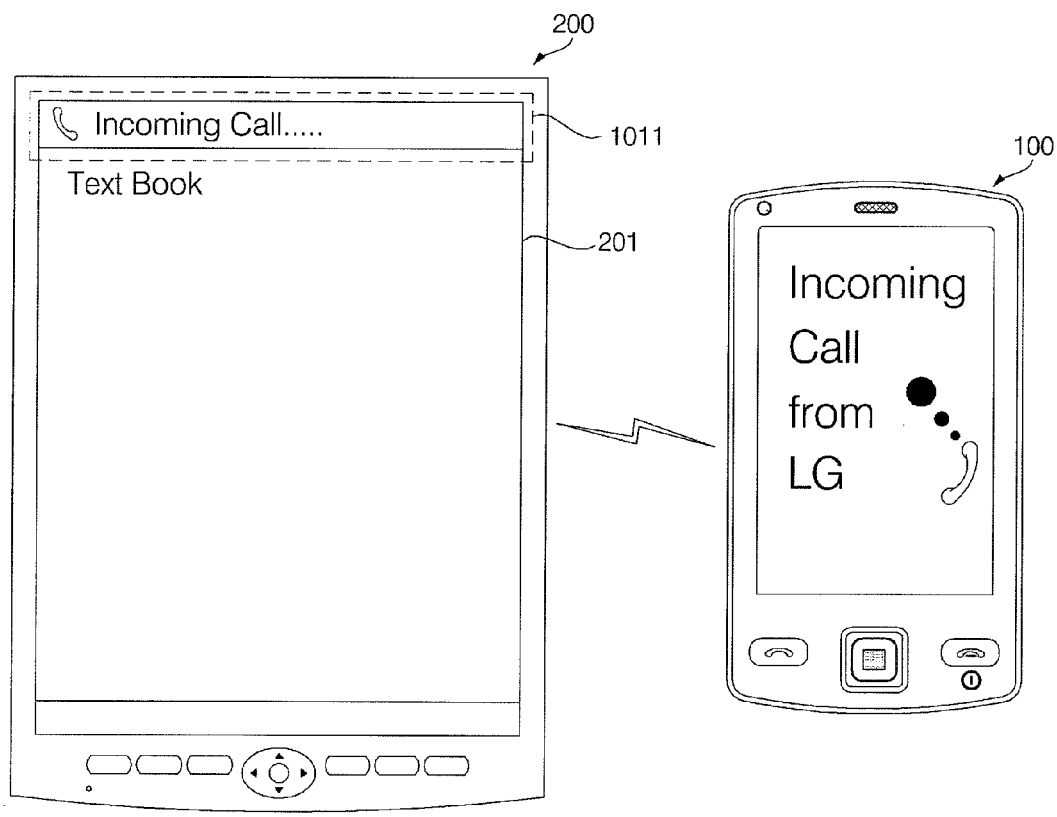

Referring to FIG. 8, the PMPA 200 according to an exemplary embodiment transmits and receives wireless signals to and from the mobile terminal 100 and identifies the current mode of the mobile terminal 100 based on a signal received from the mobile terminal 100. As described above, the mobile terminal 100, which can wirelessly communicate with the PMPA 200, may be placed in an idle mode, an incoming call mode, and/or an incoming message mode.

As shown in FIG. 8, the mobile terminal 100 is currently in the incoming call mode. When the mobile terminal 100 transitions from the idle mode to the incoming call mode, the mobile terminal 100 transmits information about the changed current mode to the PMPA 200. Then the PMPA 200 identifies the current mode of the mobile terminal 100 based on the received signal. As the PMPA 200 determined that the mobile terminal 100 is now in the incoming call mode, the PMPA 200 displays an image representing the current mode of the mobile terminal 100 on the screen 201. Specifically, the PMPA 200 may display a banner 1011 indicating that the mobile terminal 100 is currently in the incoming call mode in the upper part of the screen 201 so that the user of the PMPA 200 may be aware from the banner 1011 that the mobile terminal 100 is now in the incoming call mode.

Figure 9A:
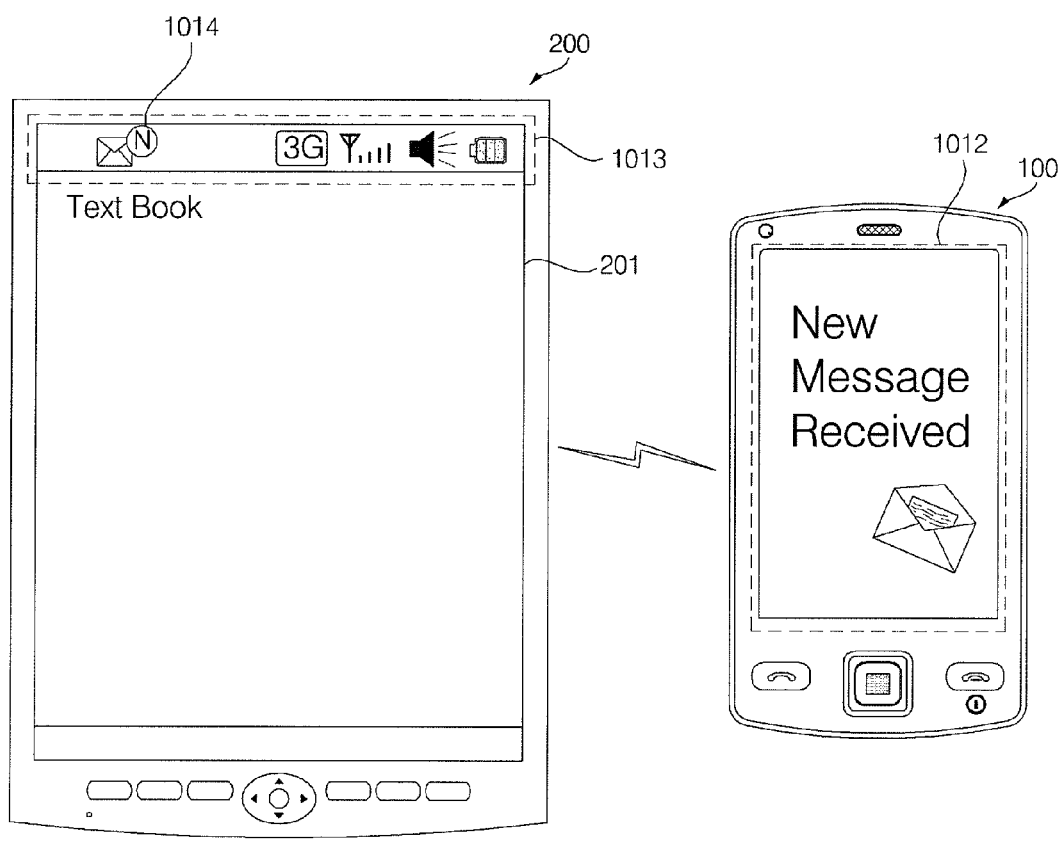

Referring to FIG. 9A, the PMPA 200 according to an exemplary embodiment displays images representing status information about the mobile terminal 100 on the screen 201. In particular, the PMPA 200 displays a status bar 1013 with icons representing the status information about the mobile terminal 100 on the screen 201. As seen in FIG. 9A, upon receipt of a message, the mobile terminal 100 displays a message reception screen 1012 and transmits a signal indicating the message reception to the PMPA 200. Then the PMPA 200 changes the display status of an icon included in the status bar 1013 in accordance with status information included in the signal received from the mobile terminal 100. In particular, the PMPA 200 may display an icon 1014 in the status bar 1013 indicating that a new message has been received at the mobile terminal 100 so that the user may recognize reception of a new message at the mobile terminal 100.

Figure 9B:
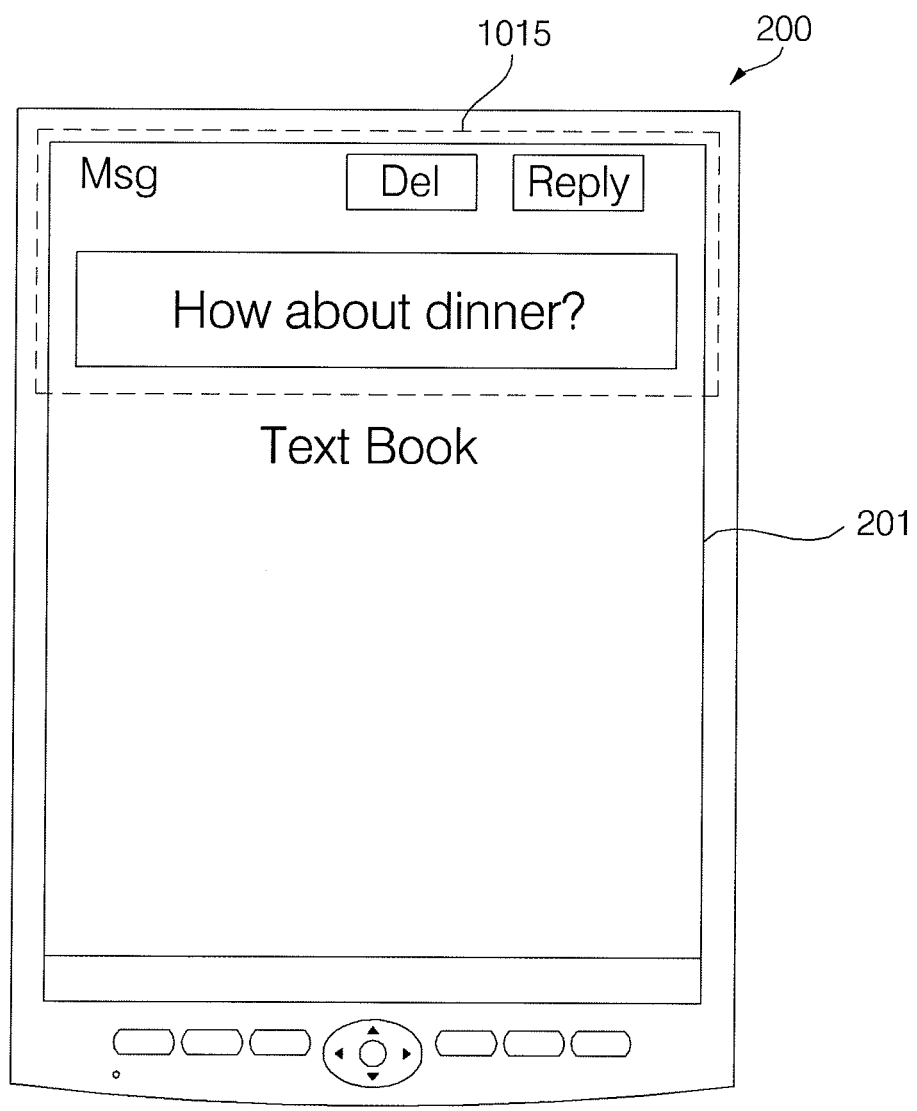

When a new message read command is received by the PMPA 200, the PMPA 200 displays a pop-up window 1015 that displays a message received at the mobile terminal 100 so that the user may read the message, as shown in FIG. 9B. The user then may enter a message delete command or a reply command to the PMPA 200. The PMPA 200 may transmit the message delete command or the reply command to the mobile terminal 100 based on the user-input command.

Figure 10A:
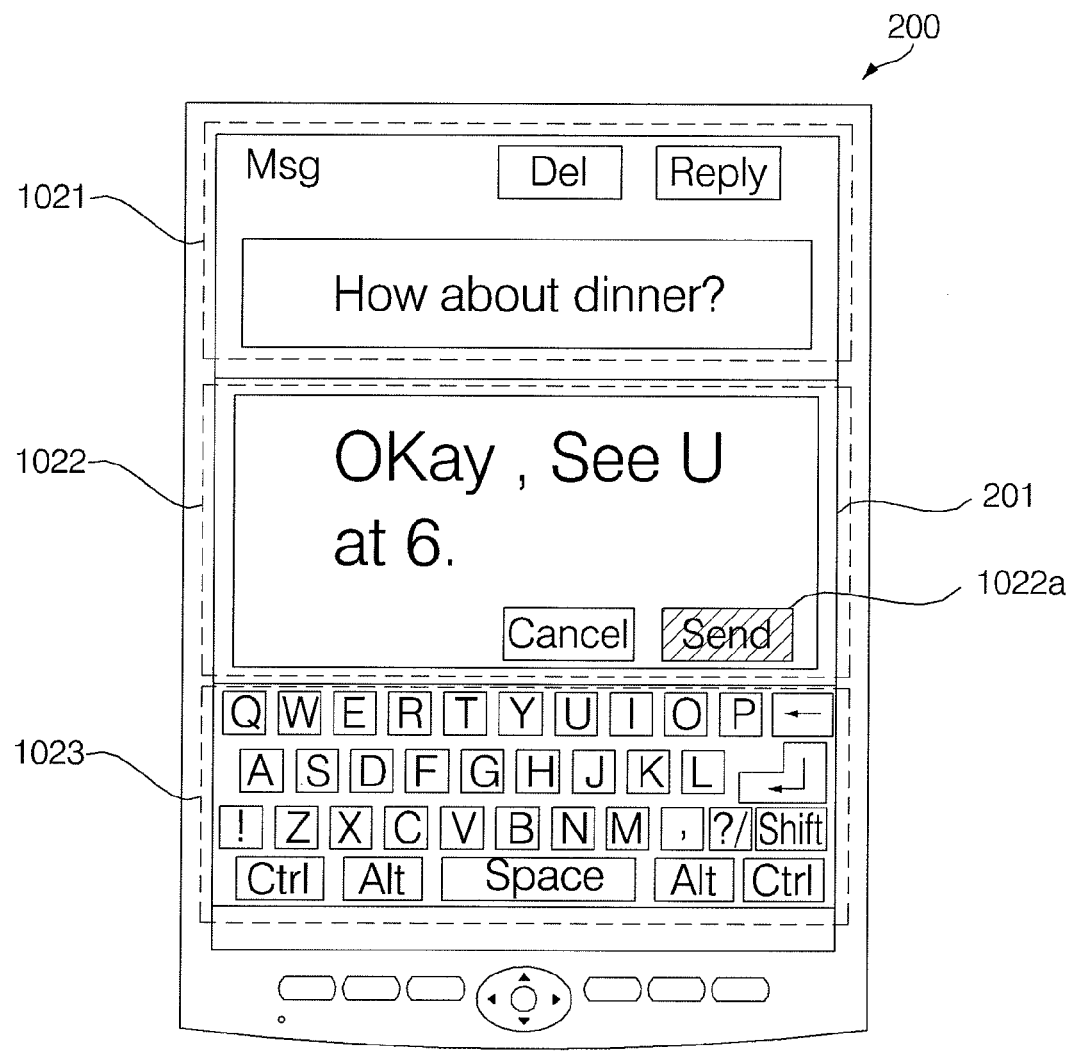
Figure 10B:
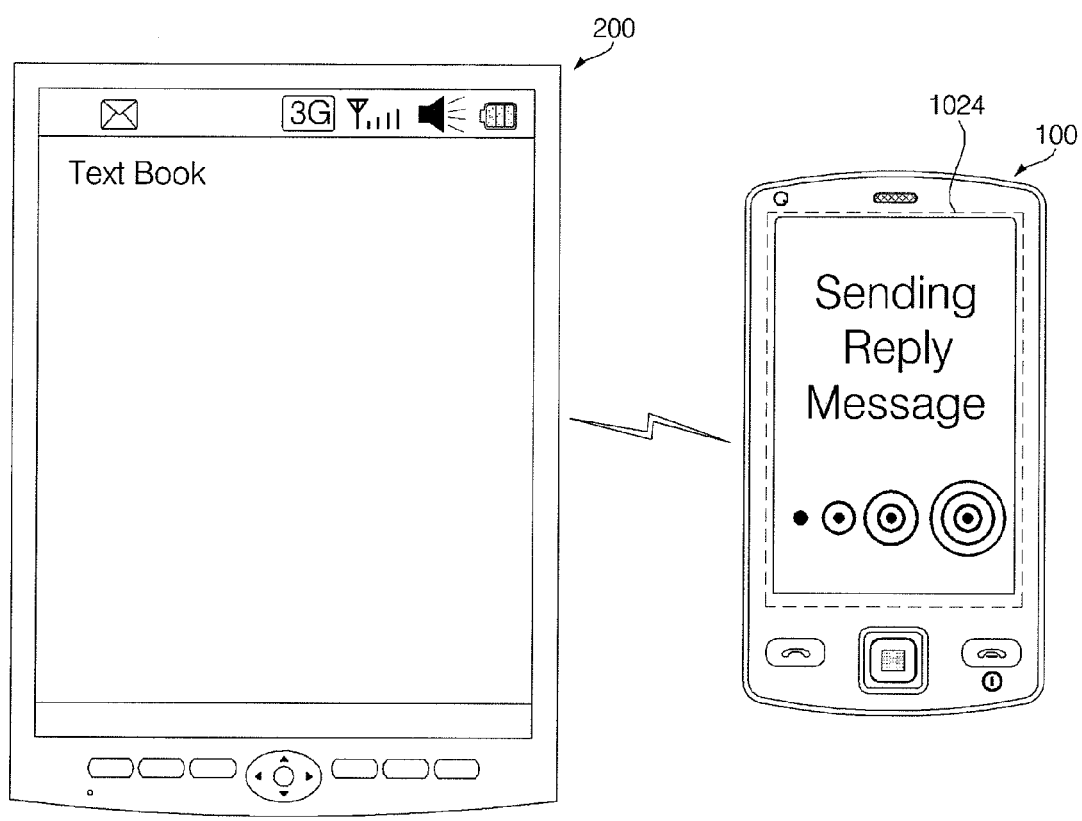

For example, with reference to FIGS. 10A and 10B, the user of the PMPA 200 may transmit a reply command to the mobile terminal 100. In particular, the user of the PMPA 200 may write a second message as a reply to a first message received at the mobile terminal 100. The PMPA 200 may transmit the second message to the mobile terminal 100 and, in turn, the mobile terminal 100 may output the second message to another mobile terminal from which the mobile terminal 100 has received the first message.

Referring to FIG. 10A, the PMPA 200 according to an exemplary embodiment displays a window 1021 for displaying a message received at the mobile terminal 100 and a window 1022 for displaying a keyboard object 1023 and a message written by the user through the keyboard object 1023, on the screen 201. After reading the message received at the mobile terminal 100 through the PMPA 200, the user may enter a reply message to the PMPA 200 through the keyboard object 1023. If the screen 201 is displayed on a touch screen, the PMPA 200 determines that characters corresponding to user-touched areas have been received and displays a message composed of the user-input characters on the window 1022.

After confirming the message written through the PMPA 200, the user may enter a command for selecting an object 1022*a* representing a send command to the PMPA 200 by touching the send command object 1022*a*. The PMPA 200 transmits a signal corresponding to the user-input reply send command to the mobile terminal 100. Specifically, the PMPA 200 transmits a signal carrying a second message as a reply to a first message received at the mobile terminal 100 to the mobile terminal 100. The mobile terminal 100, as shown in FIG. 10B, may detect the second message from the received signal and output the second message to another mobile terminal from which the mobile terminal 100 received the first message.

Figure 11:
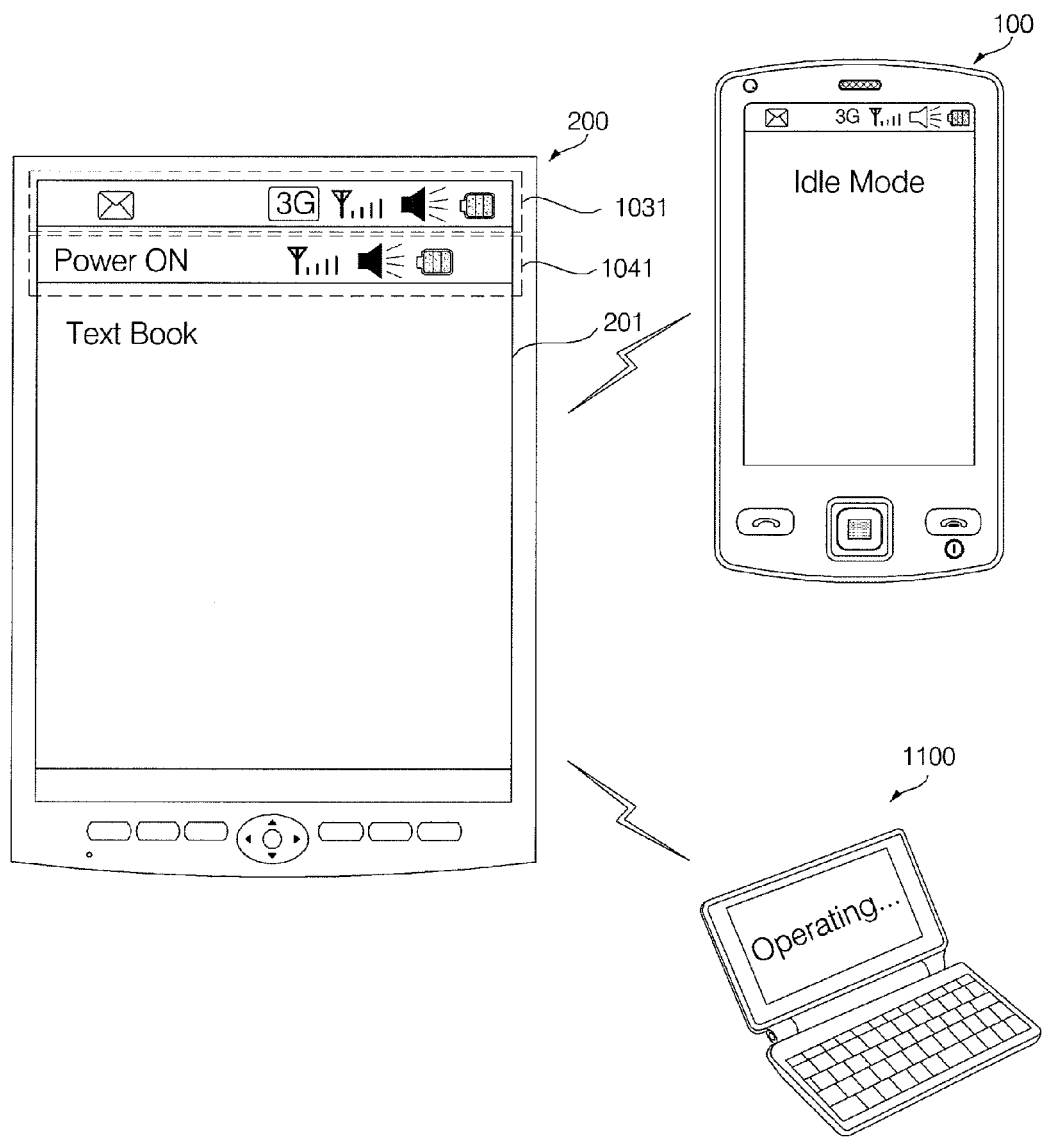

While the above operations have been described with respect to a portable multimedia playback system formed by a PMPA 200 and a mobile terminal 100, the above operations may be implemented by a portable multimedia playback system having a PMPA 200 and multiple mobile terminals. For example, as shown in FIG. 11, the PMPA 200 may determine status information about at least two mobile terminals 100 and 1100 and display images corresponding to the status information about the mobile terminals 100 and 1100 on the screen 201. Specifically, the PMPA 200 may transmit and receive wireless signals to and from the mobile terminal 100 capable of executing a phone application and a mobile terminal 1100 that can be used as a laptop according to a predetermined communication standard.

The PMPA 200 determines the status information about the mobile terminals 100 and 1100 based on signals received from the mobile terminals 100 and 1100 and displays status bars 1031 and 1041, each status bar 1031 and 1041 including icons representing the status information for the corresponding mobile terminal 100 and 1100. In particular, the PMPA 200 displays, on the screen 201, the status bar 1031 which includes an icon representing a message reception status of the mobile terminal 100 and the status bar 1041 which includes icons representing a power on/off status, radio signal reception sensitivity, volume level, and a residual battery power level of the laptop computer 1100. Thus the user can identify the statuses of the mobile terminals 100 and 1100 from the status bars 1031 and 1041 and the icons included in the status bars 1031 and 1041 displayed on the screen 201 of the PMPA 200.

Figure 12:
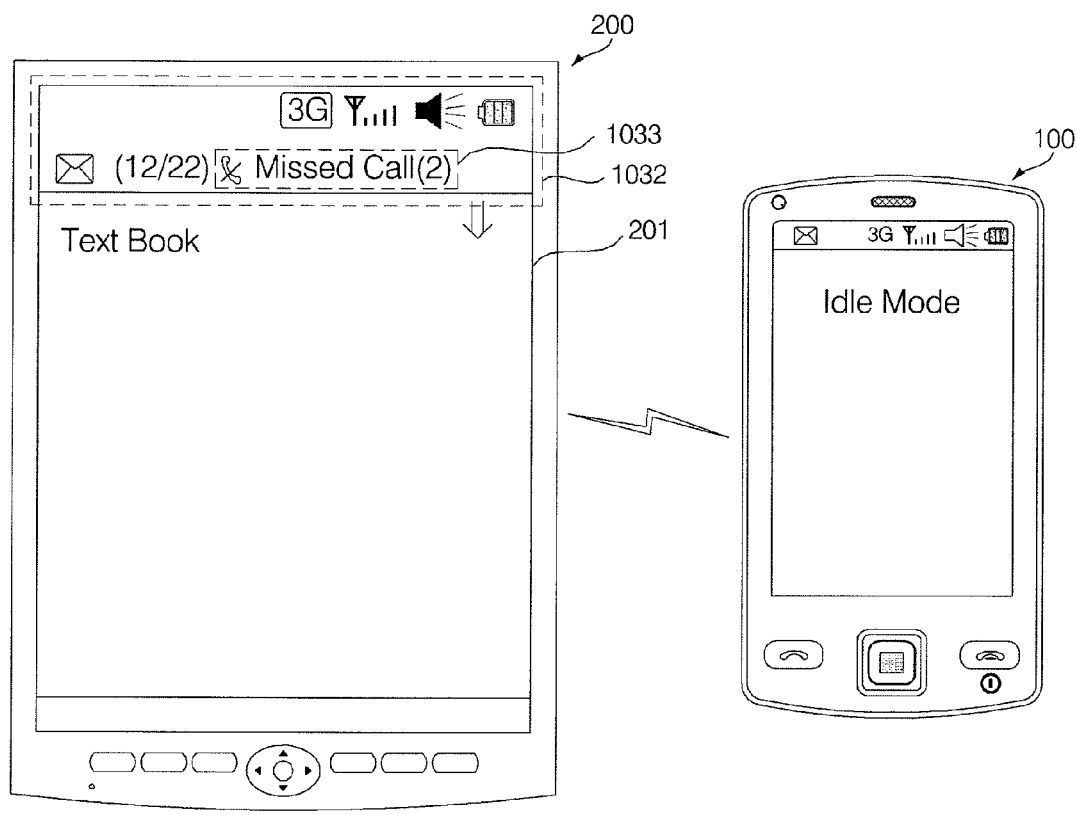

Referring to FIG. 12, the PMPA 200 according to another exemplary embodiment determines status information about the mobile terminal 100 from a signal received from the mobile terminal 100 and displays the status bar 1031 representing the status information on the screen 201 similar to that shown in FIG. 7. The PMPA 200 may change the display status of the status bar 1031 on the screen 201. For example, upon receipt of a command for scrolling the status bar 1031 in an arrowed direction on the screen 201, the PMPA 200 may change the display status of the status bar 1031 in accordance with the received command. For example, the status bar 1032 is enlarged on the screen 201 according to a user-input display area zoom-in command. As illustrated in FIG. 12, the number of icons included in the status bar 1032 and the amount of status information about the mobile terminal 100 that can be displayed in the status bar 1032 are also changed. In this exemplary embodiment of the present disclosure, the PMPA

200 displays an object 1033 representing the incoming call reception status of the mobile terminal 100 in the enlarged status bar 1032.

In addition to the foregoing exemplary embodiments, the portable multimedia playback system may be configured such that even when the mobile terminal 100 is placed in an idle mode or sleep mode, the PMPA 200 receives a signal indicating that a message was received by the mobile terminal 100.

While the foregoing exemplary embodiments describe the ability of the PMPA 200 to receive status information regarding the mobile terminal 100 and in some instances control the mobile terminal 100, it is understood that the mobile terminal 100 may also have some control over the PMPA 200. For example, the mobile terminal 100 may be configured such that a user can provide a command that disconnects the communication between the mobile terminal 100 and the PMPA 200 or places the PMPA 200 in an idle state. This command may be in the form of a touch input. As a result, the PMPA 200 and the mobile terminal 100 need not be in constant communication, thereby saving power.

As is apparent from the above description of the exemplary embodiments of the present disclosure, a user can play back and view contents through the PMPA. The user can also identify the status of another type of electronic device through the PMPA. Further, the user can control another type of electronic device through the PMPA.

The PMPA, the portable multimedia playback system, and the method for controlling operations thereof according to the foregoing exemplary embodiments are not restricted to the exemplary embodiments set forth herein. Therefore, variations and combinations of the exemplary embodiments set forth herein may fall within the scope of the present disclosure.

The method for controlling operations of the PMPA and the portable multimedia playback system according to the foregoing exemplary embodiments may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable multimedia playback apparatus comprising:
a display unit configured to display multimedia content;
a controller configured to output a signal to the display unit to display an image related to the multimedia content; and
a wireless communication module configured to wirelessly transmit and receive signals to and from at least one mobile terminal capable of executing a phone application, the mobile terminal being an external device configured to wirelessly and directly communicate with the portable multimedia playback apparatus,
wherein the controller of the portable multimedia playback apparatus is configured to:
receive a signal including location information and status information about the mobile terminal wirelessly through the wireless communication module from the mobile terminal,
output a display signal to the display unit of the portable multimedia playback apparatus to display a status bar for the mobile terminal including at least one icon representing the status information about the mobile terminal, in a display area of the display unit corresponding to a relative location of the mobile terminal with respect to the portable multimedia playback apparatus, and
when a current mode of the mobile terminal is changed, change the at least one icon representing the status information according to the changed mode of the mobile terminal, and
wherein the status information includes information about the current mode of the mobile terminal including at least one of an idle mode, an incoming call mode, or an incoming message mode.

2. The portable multimedia playback apparatus of claim 1, wherein the status bar includes a section indicating that the mobile terminal is operating.

3. A portable multimedia playback system comprising:
at least one mobile terminal configured to execute a phone application; and
a portable multimedia playback apparatus including:
a display unit configured to display multimedia content;
a controller configured to output a signal to the display unit to display an image related to the multimedia content; and
a wireless communication module configured to wirelessly transmit and receive signals to and from the mobile terminal,
wherein the controller of the portable multimedia playback apparatus is configured to:
receive a signal including location information and status information about the mobile terminal wirelessly through the wireless communication module from the mobile terminal,
output a display signal to the display unit of the portable multimedia playback apparatus to display a status bar for the mobile terminal including at least one icon representing the status information about the mobile terminal, in a display area of the display unit corresponding to a relative location of the mobile terminal with respect to the portable multimedia playback apparatus, and
when a current mode of the mobile terminal is changed, change the at least one icon representing the status information according to the changed mode of the mobile terminal, wherein the status information includes information about the current mode of the mobile terminal including at least one of an idle mode, an incoming call mode, or an incoming message mode, and wherein the mobile terminal is an external device configured to wirelessly and directly communicate with the portable multimedia playback apparatus.

4. A method for controlling an operation of a portable multimedia playback apparatus (PMPA) including a display unit configured to display multimedia content and a controller configured to output a signal to the display unit to display an image related to the multimedia content, the method comprising:

wirelessly communicating with at least one mobile terminal capable of executing a phone application, the mobile terminal being an external device configured to and directly wirelessly communicate with the portable multimedia playback apparatus;

receiving a signal including local information and status information about the mobile terminal wirelessly from the mobile terminal, in a display area of the display unit corresponding to a relative location of the mobile terminal with respect to the portable multimedia playback apparatus; and outputting a display signal from the controller to the display unit of the portable multimedia playback apparatus to display a status bar for the mobile terminal including at least one icon representing the status information about the mobile terminal; and when a current mode of the mobile terminal is changed, changing the at least one icon representing the status information according to the changed mode of the mobile terminal, wherein the status information includes information about the current mode of the mobile terminal including at least one of an idle mode, an incoming call mode, or an incoming message mode.

5. The method according to claim 4, further comprising, when the current mode of the mobile terminal changes, changing the signal output to the display unit such that the at least one icon corresponding to the status information is changed on the display unit.

6. The method according to claim 4, further comprising:
detecting an icon selection command for including an icon in the status bar to the PMPA; and
storing an icon list corresponding to the icon selection command,
wherein the outputting the signal includes outputting the signal from the controller to the display unit such that the status bar includes icons listed in the stored icon list is displayed on the display unit.

7. The method according to claim 4, wherein the at least one icon is at least one of an icon representing a message reception status of the mobile terminal, an icon representing an incoming call reception status of the mobile terminal, an icon representing an alarm status of the mobile terminal, and an icon representing a scheduled status of the mobile terminal.

8. The method according to claim 4, wherein receiving the signal from the mobile terminal includes receiving the signal through the wireless communication module, and
wherein outputting the display signal includes outputting the display signal from the controller to the display unit such that the at least one icon representing the status information is included in the status bar on the display unit.

9. The method according to claim 4, further comprising:
detecting a command for changing a display area of the at least one icon corresponding to the status information; and
changing the display area of the at least one icon corresponding to the status information on the display unit according to the detected command.

10. The method according to claim 9, wherein the display unit of the PMPA further includes a touch screen, and
wherein detecting the command for changing the display area further includes at least one of detecting whether the display area of the at least one icon corresponding to the status information is touched and dragged and detecting whether the display area of the at least one icon corresponding to the status information is touched for at least a predetermined time.

11. The method according to claim 9, wherein changing the display area includes a stepwise enlarging of the display area of the at least one icon corresponding to the status information.

12. The method according to claim 4, wherein the display area corresponding to the relative location of the mobile terminal is positioned at one of an upper portion, a lower portion, a left portion, and a right portion of the display unit.

13. The method according to claim 4, further comprising:
receiving a signal from another mobile terminal; and
determining a relative location of the other mobile terminal with respect to the portable multimedia playback apparatus,
wherein outputting the display signal outputting includes outputting the display signal from the controller to the display unit such that icons corresponding to status information about each of mobile terminals is displayed in an area corresponding to the relative locations of the mobile terminals.

14. The method according to claim 4, further comprising:
detecting an object display command for displaying a keyboard object through which text is entered for transmission to the mobile terminal; and
displaying the keyboard object on the display unit after detecting the object display command.

15. The method according to claim 14, further comprising transmitting a signal carrying information about text entered through the keyboard object to the mobile terminal.

16. A method for controlling an operation of a portable multimedia playback system having a portable multimedia playback apparatus (PMPA) and at least one mobile terminal capable of executing a phone application, the PMPA including a display unit configured to display multimedia content and a controller configured to output a signal to the display unit to display an image related to the multimedia content, and the mobile terminal being an external device configured to wirelessly and directly communicate with the PMPA, the method comprising:

transmitting a signal including location information and status information about the mobile terminal wirelessly to the PMPA by the mobile terminal;

receiving the signal from the mobile terminal by the PMPA;

determining the status information about the mobile terminal based on the received signal by the PMPA; and outputting a first display signal to the display unit of the PMPA by the controller of the PMPA such that a status bar for the mobile terminal including at least one icon representing the status information is displayed on a display area of the display unit corresponding to a relative location of the mobile terminal with respect to the PMPA;

when a current mode of the mobile terminal is changed, outputting a second display signal to the display unit of the PMPA by the controller of the PMPA such that the at least one icon representing the status information is changed according to the changed mode of the mobile terminal, wherein the status information includes information about a current mode of the mobile terminal including at least one of an idle mode, an incoming call mode, or an incoming message mode.

17. The method according to claim 16, further comprising:

detecting an object display command for displaying a keyboard object through which text is entered for transmission to the mobile terminal has been received by the PMPA; and displaying the keyboard object on the display unit after detecting the object display command.

18. The method according to claim 17, further comprising transmitting a signal carrying information about text entered through the keyboard object to the mobile terminal by the PMPA.

19. The method according to claim 18, further comprising:

receiving the signal carrying text information from the PMPA by the mobile terminal;

determining the text information from the received signal by the mobile terminal; and transmitting a message based on the determined text information to a base station by the mobile terminal.

* * * * *